3,609,907
CASTING FLOAT FOR FLY FISHING
Sondre Wiig, 25 Dyrefaret, 1340 Bekkestua, Norway
Filed Jan. 16, 1969, Ser. No. 791,734
Claims priority, application Norway, Jan. 20, 1968,
247/68
Int. Cl. A01k 93/00
U.S. Cl. 43—43.15                                                    3 Claims

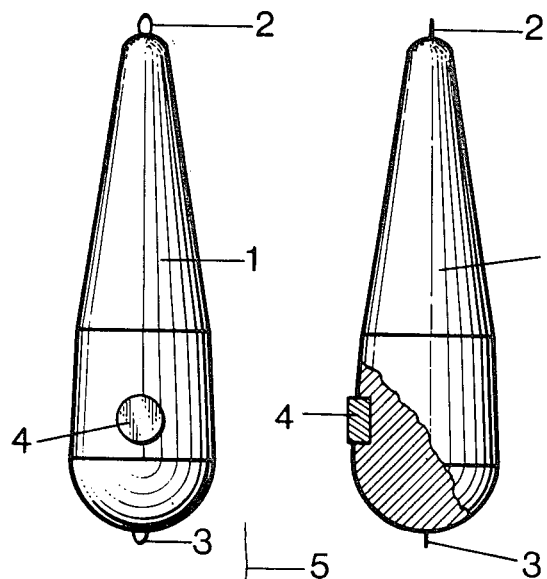
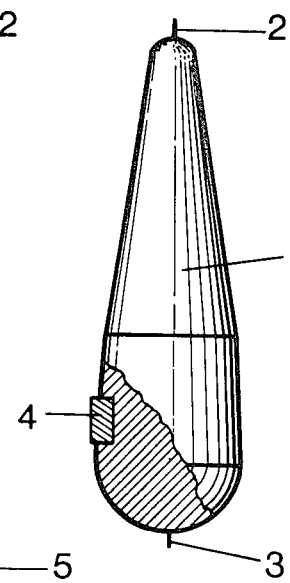
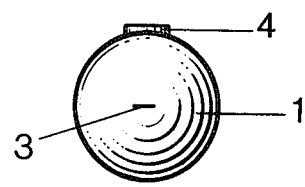
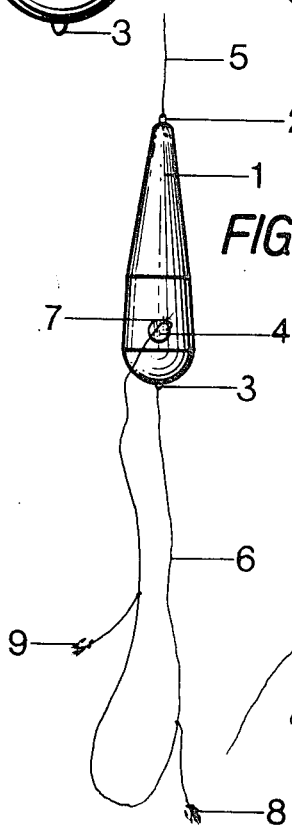
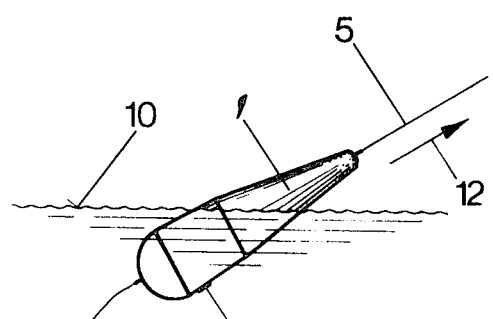

ABSTRACT OF THE DISCLOSURE

A sport fishing casting float for fly fishing comprises a tear-drop shaped buoyant body provided with one attachment for the fishing line and one for the leader whose free end has a fly in the form of a steel hook attached thereto. The buoyant body is furnished with a releaseable attachment means for the fly, the attachment means being in the form of a magnetic body able to hold the steel hook with appropriate attractive force. Release of the fly is effected by reeling in the line.

---

This invention relates to a sport fishing casting float for fly fishing, and particularly to a novel from a casting float comprising a tear-drop buoyant body provided with one attachment for a fishing line and one for a leader to the free end of which is attached a fly. Such float is primarily used when it is desirable to utilize a spinning rod or a light bait casting rod for fly fishing.

Various types of such floats are known. However, the devices of this kind are hampered by several drawbacks, one of which is that for all practical purposes they only can be utilized with a relatively short leader, i.e. the line extending between the float and the fly, since the leader must be of such length that the fly does not reach to the ground when the rod is ready to be used.

A further drawback even when the leader is relatively short is that the leader together with the fly flutters as a spiral in the air during the throw, frequently resulting in tangling of the fly with the fishing line and the leader. In order to overcome these drawbacks it has been heretofore attempted to develop devices to releasably attach the fly to the float before the throw is made in such a way that the fly is released from the float subsequent to the contact of the float with the water surface. Such devices have further drawbacks; for instance, they are complicated and cumbersome. Furthermore, with the known devices the fly frequently releases itself from the attachment means too early; for instance, during the throw or in the air, and the fly and/or the leader becomes twisted with the fishing line or gets caught by the attachment means of the float.

The known devices thus impose a restraint upon the operator so as to reduce the effective casting distance and also the accuracy.

The object of the present invention is to overcome these disadvantages in a simple and reliable manner and this is achieved by furnishing the float with a small permanent magnet for magnetic attachment of a fly formed as a steel hook. The invention and its operation will appear more clearly from the following description in connection with the accompanying drawing wherein:

FIG. 1 is a side elevational view of a casting float embodying the invention,

FIG. 2 shows the float in FIG. 1 with the magnetic body shown in section turned 90° and partly broken away and in section, FIG. 3 is an end view of the float, FIG. 4 shows the casting float mounted and ready for throwing, and FIG. 5 is a schematic elevation view illustrating the float subsequent to a throw and when hauling or reeling is initiated.

The float in accordance with the invention consists of a substantially tear-drop shaped body 1, to the upper end of which is attached a ring 2 for a fishing line. At the other end is attached a second ring 3 for attachment of the leader. On the side of the float close to the thicker end is attached a magnetic body 4.

The magnetic body, in the preferred embodiment shown, is fitted into a suitable recess in the body 1.

The float according to the invention operates in the following manner: The fishing line 5 is attached to the ring 2 at the upper end of the body 1. The leader 6 is attached to the ring 3 at the lower end of the float. Thereafter, when a throw is to be made, a fly 7 attached to the free end of the cast is positioned on the magnetic body 4 and the assembly is ready to be thrown. Reference numerals 8 and 9 designate two further flies which, of course, are optional. When the throw is completed the float is positioned in the water together with the fly. When reeling in or hauling of the fishing line 5 is initiated in the direction indicated by the arrow 12 in FIG. 5, the friction or the resistance arising between the leader 6 and the water will provide sufficient tension in the leader to pull the fly from the magnet, with the result that the leader 6 will extend out in the water or along the water surface 10 in a straight line. It will be understood that the leader is formed as a loop in the water when the fly is attached to the magnet.

It is obvious that the shape of the float and the form of magnetic body utilized, and likewise the position of the magnet as shown in the drawing is by way of example. Furthermore, by the expression "fishing fly" shall be understood any kind of imitation bait including a steel hook, such as wet flies, dry flies, spinners, nymphs, etc. The invention is naturally not limited to any specific form or manner of practicing same, except insofar as such limitations are specified in the appended claims.

What is claimed is:

1. A casting float for fly fishing comprising a tear-drop shaped buoyant body having a line attached to the narrower end and a leader attached to the wider end, a fishing fly of magnetized material secured to the free end of the leader, releaseable attachment means on said body for holding said fishing fly thereagainst, the attachment means comprising a magnetic body secured to the buoyant body and able to hold the fly against the body with sufficient attractive force during a cast while permitting release therefrom after the float has contacted a body of water and is moved therein by the reeling in of the line.

2. A float as claimed in claim 1 wherein said buoyant body has a recess and said magnetic body is mounted within said recess.

3. A float as claimed in claim 1 wherein said fly is a steel hook.

References Cited

UNITED STATES PATENTS

| | | | |
|---|---|---|---|
| 2,246,757 | 6/1941 | Rosegard | 43—42.04 |
| 2,275,869 | 3/1942 | Seaton | 43—42.04 |
| 2,459,819 | 1/1949 | Hoage | 43—42.43 |
| 2,549,463 | 4/1951 | Hansen et al. | 43—42.04 |

SAMUEL KOREN, Primary Examiner

D. J. LEACH, Assistant Examiner

U.S. Cl. X.R.

43—43.12